United States Patent [19]
Kane, Jr. et al.

[11] Patent Number: 5,321,343
[45] Date of Patent: Jun. 14, 1994

[54] DIGITAL MOTOR CONTROL SYSTEM

[75] Inventors: John W. Kane, Jr., Pittsburgh; William S. Oleyar, White Oak; Robert S. Peterson, Pittsburgh, all of Pa.

[73] Assignee: AEG Automation Systems Corporation, Pittsburgh, Pa.

[21] Appl. No.: 17,804

[22] Filed: Feb. 16, 1993

[51] Int. Cl.$^5$ .............................................. H02P 13/20
[52] U.S. Cl. ................................... 318/254; 363/123; 363/128
[58] Field of Search ............... 318/594, 138, 139, 439, 318/254, 706, 803, 800; 363/123, 98, 96, 128, 56, 71, 132, 17, 131, 65, 16, 54

[56] References Cited

U.S. PATENT DOCUMENTS

| | | | |
|---|---|---|---|
| 3,983,464 | 9/1976 | Peterson | 318/327 |
| 4,028,601 | 6/1977 | Peterson | 318/271 |
| 4,047,080 | 9/1977 | Peterson | 318/79 |
| 4,152,632 | 5/1979 | Peterson | 318/334 |
| 4,186,437 | 1/1980 | Cuk | 363/65 |
| 4,230,976 | 10/1980 | Müller | 318/254 |
| 4,423,362 | 12/1983 | Konrad et al. | 318/139 |
| 4,683,411 | 7/1987 | Hamilton, Jr. et al. | 318/706 |
| 4,685,040 | 8/1987 | Stergerwald et al. | 363/98 |
| 4,805,081 | 2/1989 | Chambers et al. | 363/96 |
| 4,959,797 | 9/1990 | McIntosh | 318/594 |
| 4,982,145 | 1/1991 | Peterson | 318/594 |
| 4,992,919 | 2/1991 | Lee et al. | 363/17 |

Primary Examiner—William M. Shoop, Jr.
Assistant Examiner—John W. Cabeca
Attorney, Agent, or Firm—R. V. Westerhoff

[57] ABSTRACT

A control system for one or more dc motors in which thyristor power modules selectively gate portions of half cycles of ac voltage to the motor field and armature windings, has digitally implemented parallel inner control loops for the armature which each generate an intermediate control signal to which proportional plus derivative control action has been applied. Logic selects the intermediate control signal which phases back firing pulses for the thyristor power modules the most for application to a common digital integrator which produces a control signal having proportional plus integral control action. The voltage across each of the thyristors is monitored and used to detect continuous and discontinuous current operation for adjusting integrator gain.

14 Claims, 8 Drawing Sheets

FIG. 7B

DIGITAL MOTOR CONTROL SYSTEM

BACKGROUND OF THE INVENTION

1. Field of the Invention

This invention relates to a digitally implemented control system for a motor, and particularly to a low cost, flexible, multi-loop, digital system fo controlling one or more dc motors powered from an ac power source.

2. Background Information

A common type of control system for a dc motor utilizes a thyristor power module to gate selected portions of half cycles of power from an ac source to the motor armature. Typically, a second thyristor power module controls the field current.

Gating signals for the thyristor power modules have traditionally been generated by analog control circuits. These analog control circuits for the thyristor power module energizing the armature, typically have had an inner loop regulating armature current and an outer loop regulating a second parameter such as speed or torque. Some systems have multiple inner loops for controlling energization of the armature. These additional loops provide alternative voltage control and current limits, for instance, in addition to current control. As the loops are feedback loops, each of the control signals represents an error in the control parameter. The largest control or error signal is selected for use in generating the firing signals for the thyristor power module. Typically, control action, such as proportional plus integral control, is applied in the control loops. Traditionally, each loop has its own integrator. While only one inner loop is effective at a time, the individual integrators of the non-selected loops are each made to track the output of the active integrator, so that bumpless transfer can be made between loops.

Under low load conditions, the converter phases back gating of voltage pulses to the armature. With this phase back, a point is reached where the current applied to the motor becomes discontinuous. As the gain of the converter changes when the current is discontinuous, gain compensation must be applied to the current controller under these conditions. A common method of detecting discontinuous current relies upon monitoring the average current in the armature circuit. The system is tuned up, and when the average current drops below a selected minimum value, it is presumed that the discontinuous current condition exists and the current controller gain compensation is applied. However, the average current is not an accurate determinant of discontinuous current.

The development of powerful, low cost, microprocessors has lead to the digital implementation of the control schemes traditionally carried out by the analog control circuits of dc motor control systems. However, as far as known, these digital systems still output an analog firing signal to the thyristor power module.

SUMMARY OF THE INVENTION

It is a primary object of the present invention to provide an improved, low cost, digitally implemented system for controlling a dc motor energized from an ac power source.

It is a more particular object of the invention to provide such an improved, low cost, dc motor control system with multiple parallel control loops which requires only one integrator for providing integral control action for each loop.

It is an additional object of the invention to provide such a control system with an improved capability of detecting discontinuous current conditions.

These objects and others are realized by the invention which is directed to a control system for controlling energization of a dc motor with ac power which includes digital processor means digitally generating plural parallel control loops each controlling a selected motor parameter in response to an associated parameter signal.

Each of these parallel digital control loops includes digital means applying selected control action, preferably derivative and proportional control action to the associated parameter signal to generate an associated intermediate control signal. One of these intermediate control signals is selected for application to a common digital integrator which, upon integrating the selected intermediate control signal, produces a resultant control signal having the integral of the selected control action. In the preferred embodiment, this is the traditional proportional plus integral control action.

As another aspect of the invention, the system monitors the voltages across the switches of the converter gating portions of the half cycles of the ac power to the motor to detect discontinuous current operation of the converter. More particularly, means are provided setting a discontinuous current mode signal when a voltage is detected simultaneously across all of the switches of the converter. The mode signal is reset to a continuous mode signal when the voltages across any two consecutively fired switches connected to the same dc bus in the converter drop below a threshold value.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
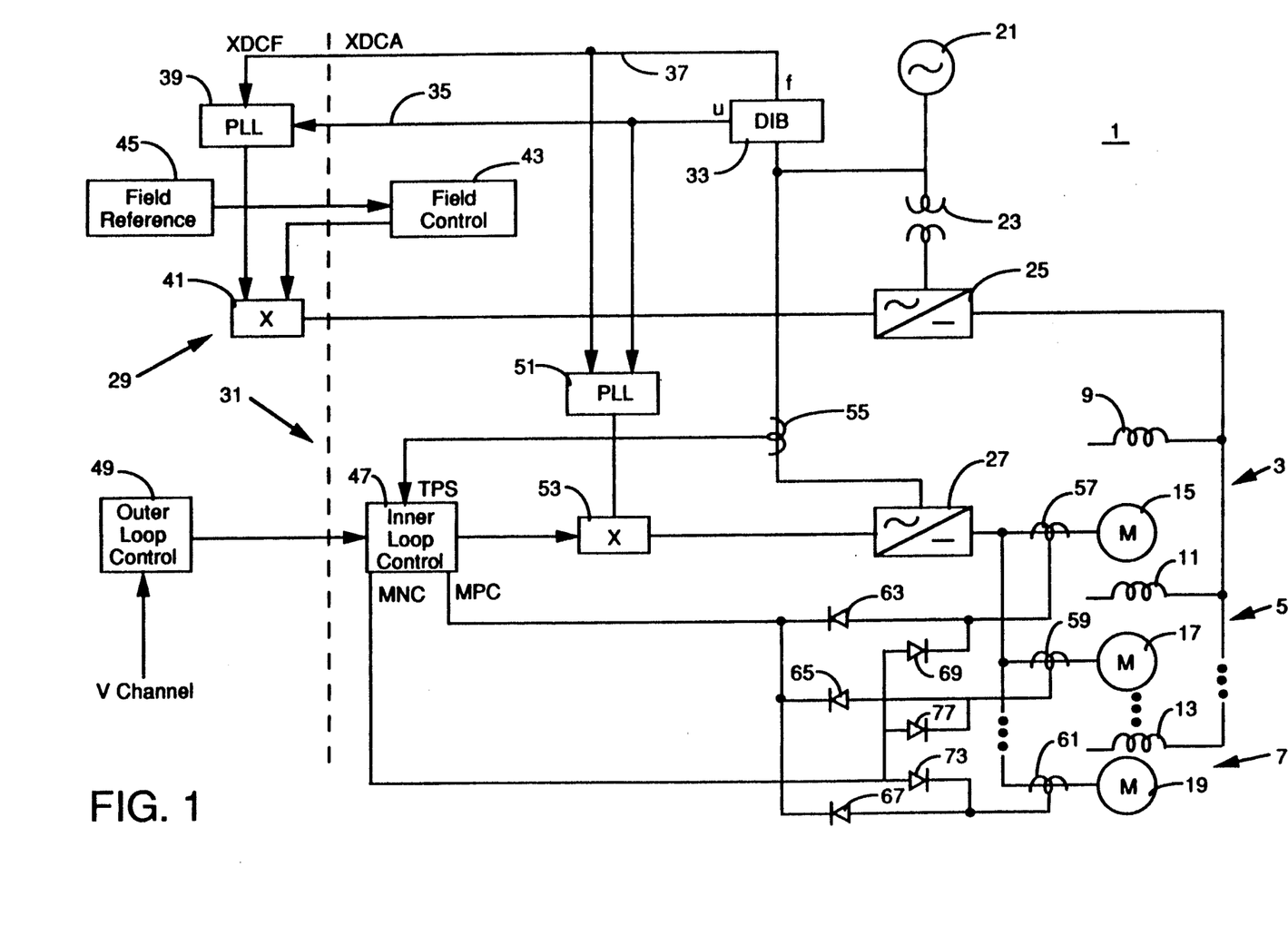
FIG. 1 is a block diagram of a motor control system in accordance with the invention.

The present invention is applicable to control systems for dc motors used in various applications. It is particularly useful for, and will be described in connection with a drive system for dc motors used in a rolling mill or other process line in the metals industry. In the exemplary embodiment of the invention set forth in detail, the control system 1 controls the operation of several dc motors 3, 5 and 7 which are energized in parallel. Each of the motors 3, 5 and 7 includes a field winding 9, 11 and 13 and an armature winding 15, 17 and 19, respectively. Both the field windings and the armatures are energized by an ac source 21. The ac power is applied through an isolation transformer 23 to a field thyristor power module (TPM) 25 and directly to an armature thyristor power module 27. The thyristor power modules 25 and 27, which are well known in the art, consist of an array of thyristors which are fired sequentially to generate pulsed dc power which is applied to the field windings and armatures, respectively.

Firing of the thyristors in the thyristor power module 25 is controlled by a field control circuit 29, while the firing of the thyristors in the thyristor power module 27 is controlled by an armature control circuit 31. Firing of the thyristors in both the power modules 25 and 27 is synchronized to the line voltage produced by the ac power source 21. As the line voltage has considerable noise, including commutation notches produced by the thyristors in the TPMs, a Drive Interface Board (DIB) 33 generates a digital unfiltered line voltage signal, u, on lead 35 and a filtered line voltage signal, f, on lead 37 for use by the TPMs in synchronizing the firing pulses for the respective TPMs to the line voltage.

In the field control circuit 29, a digital phase lock loop (PLL) 39 operates to initially determine the phase shift due to filtering between the filtered and unfiltered line voltage signals, which is typically about 90 degrees. The phase lock loop then uses the calculated phase shift together with the filtered line voltage signal to provide a gating reference signal to the gating circuit 41.

A field control module 43 regulates either field voltage or field current, according to the application, to a reference supplied by a field reference module 45 by generating a control signal which is used by the gating circuit 41 to determine the phase angle for firing the thyristors in the thyristor power module 25.

The armature control circuit 31 includes an inner control loop regulated by the inner loop control module 47 and an outer control loop regulated by an outer loop control module 49. The armature control circuit also includes a phase lock loop 51 which supplies a gating reference signal to a gating circuit 53 for the TPM 27 in a manner similar to that described above for the PLL 39.

The inner loop control 47 incorporates multiple control loops which can provide current control or voltage control for the motor armatures, and forward and reverse current protection for the individual motors. The inner loop control 47 receives a signal TPS representative of the ac current from a current transformer 55. Current transformers 57, 59 and 61 monitor the individual armature currents. Diodes 63, 65 and 67 provide a signal MPFC representing the largest forward current in any of the motors to the inner loop control 47 while the reverse connected diodes 63, 71 and 73 provide a most negative current signal MNC.

The outer loop control 49 regulates selected other system parameters such as motor speed or torque to a reference value provided over the V channel input or internally generated. Feedback for the field control 43, the outer loop control 49 and voltage feedback for the inner loop control 47 are not shown in FIG. 1 for clarity.

The digital control system of the invention is implemented with transputers. The transputer is a simplified digital processor with a limited number of registers and a minimum set of instructions which is typically used for parallel processing operations. Three transputers are used in the exemplary control system, two of which implement the functions illustrated in FIG. 1. The first transputer XDCA implements the field control module 43, the inner loop control module 47, the PLL 51 and the gating circuit 53. The field reference 45, the outer loop control module 49, the PLL 39 and the gating circuit 41 for the field TPM are implemented by the second transputer XDCF.

Figure 2:
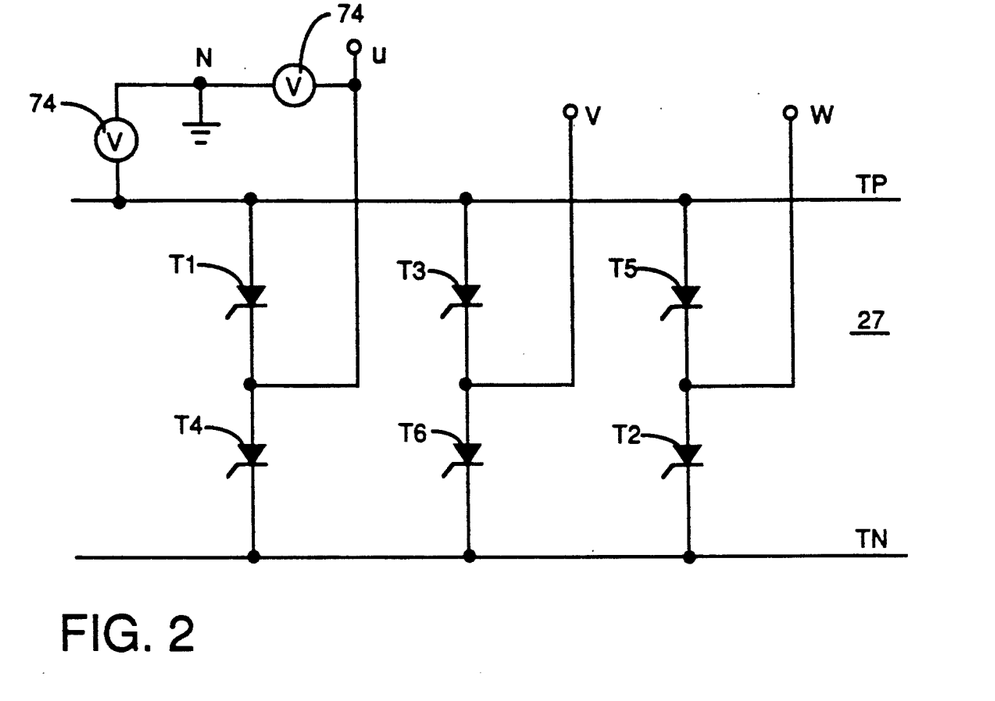
FIG. 2 is a schematic diagram of the switching circuit of a six-phase converter used in the motor control system of the invention.

The TPMs 25 and 27 are conventional six-pulse converters. FIG. 2 illustrates the positive bank of such a six-pulse converter which forms the TPM 27. Each bank of the converter includes three pairs of thyristors T1-T4, T3-T6 and T5-T2 connected in series between a positive dc bus TP and a negative dc bus TN. The three phases U, V and W of the threephase power supplied by the source 21 are connected to the midpoints of the respective thyristor pairs. The thyristors are fired in the sequence T1-T6 by firing pulses generated by the gating circuit 53. At least one of the thyristors connected to the positive bus TP and one connected to the negative bus TN are turned on to gate rectified pulses of the ac power to the motor armatures connected to the buses TP and TN. The gating circuit 53 controls the phase of the ac source voltage at which the respective thyristors are turned on, and therefore the portion of each half-cycle pulse of ac voltage which is rectified and gated to the armatures of the dc motors. For instance, increasing the firing angle delays the point in the ac waveform at which the thyristors are gated, and hence a smaller portion of each ac half-cycle is applied to the motor. The negative bank of thyristors (not shown) for the TPM 27 is similar to that of FIG. 2 except that the polarity of all of the thyristors is reversed. The positive and negative banks of thyristors control operation of the motors in the forward and reverse directions, respectively.

Each of the thyristors T1-T6 is turned on by the application of a gating pulse while the thyristor is forward biased. The thyristors remain conducting until they are turned off in one of two ways. First, a thyristor is turned off when the applied voltage passes through zero forcing the thyristor current to zero. A second way in which a thyristor can be turned off is when another thyristor connected to the same bus is turned on and applies a higher voltage to the common bus which reverse biases the first thyristor. When a thyristor is turned off under the first condition, it is said to be line commutated. When it is turned off in the second manner, it is said to be thyristor commutated.

When a thyristor is commutated off by the firing of the next thyristor connected to the same bus, so that current is continuously being supplied to the dc buses, the converter is said to be operating in the continuous current mode. This occurs when the firing angles are small, i.e., there is a short delay after the zero crossing of the ac voltage, before the firing pulse is delivered so that a thyristor is turned on before the proceding thyristor connected to the same bus is turned off. On the other hand, where a thyristor is commutated off by the line voltage because the applied voltage has passed through zero before the next thyristor connected to the same bus is turned on, the dc current is interrupted until the next thyristor is turned on.. This occurs when the firing angles are large or phased back, i.e., there is a long delay after the zero crossing before the thyristor is turned on. This is referred to as the discontinuous current mode of the converter because current is being supplied to the dc buses intermittently.

One aspect of the invention is directed to a direct, reliable scheme for detecting continuous current and discontinuous current operation of the converter. The novel scheme recognizes that during the instants that no current is applied to the dc buses there will be a voltage across each of the thyristors T1-T6. This, of course, occurs only during a portion of the time that the converter is in a discontinuous current mode, as during the remainder of the time, at least one thyristor connected to the negative dc bus and one connected to the positive dc bus will be conducting and, therefore, the voltage across those thyristors will only be their forward drop. It is further recognized that, when the converter is operating in the continuous current mode, there will be instants when two consecutively fired thyristors connected to the same dc bus will be on simultaneously while the second thyristor is commutating the first off. The present invention utilizes a programmable array logic device (PAL) to monitor the voltage across each of the thyristors T1-T6 and to generate therefrom signals indicating the mode of operation of the converter.

Figure 3:
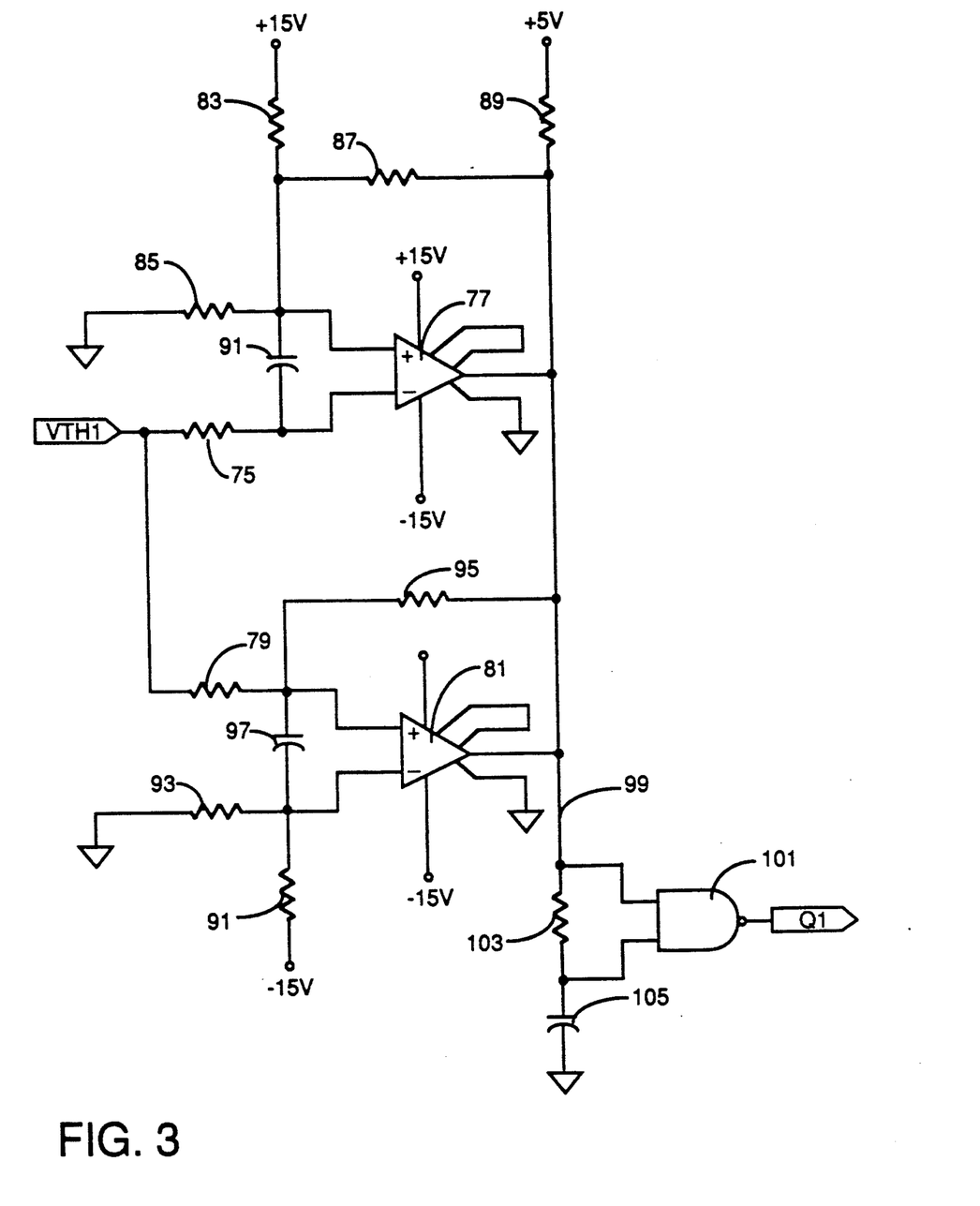
FIG. 3 is a schematic diagram of a circuit for setting logical signals representative of the conduction state of a thyristor used in the converter of FIG. 2.

The voltage across each of the thyristors is monitored and used to generate a logic signal which indicates whether the thyristor is in a blocked or a conducting state. FIG. 3 illustrates a circuit for performing this function for the voltage VTH1 which is the voltage between phase U of the ac supply and the positive bus TP of the converter. This voltage is derived from measurements of voltage between the phase U and the neutral N and the bus TP and neutral made by volt meter 74 (see FIG. 2). The thyristor voltage VTH1 is compared with small positive and negative thresholds to create a deadband around zero. Thus, the voltage VTH1 is applied through an input resistor 75 to the inverting input of a comparator 77 and through an input resistor 79 to the noninverting input of a comparator 81. The comparator 77 compares the voltage VTH1 with a positive threshold voltage produced by a voltage divider comprising the resistors 83 and 85 energized by a +15 volt supply. The feedback resistor 87 and resistor 89 provide hysteresis for the comparator 77. A capacitor 91 across the inputs of the comparator 77 filters out spikes in the voltage VTH1.

Similarly, comparator 81 compares the voltage VTH1 with a small negative threshold voltage generated by the voltage divider formed by the resistors 91 and 93 energized by a −15 volt supply, with hysteresis provided by the resistors 95 and 89, and filtering provided by the capacitor 97. The outputs of the comparators 77 and 81 are connected by lead 99 to one input of a NAND gate 101 and through a resistor 103 to the other input of the NAND 101 to generate the logic signal Q1. With the voltage VTH1 above the positive or negative threshold, the comparator 77 or 81, respectively, pulls the lead 99 down to ground to cause the logic signal Q1 to go high. A capacitor 105 forms a filter with the resistor 103 to delay the change in value of the signal applied to the lower input of the NAND 101. The time constant of this filter is set to prevent the signal Q1 from going low with the thyristor in the blocking state as the ac voltage passes through zero. Circuits similar to that shown in FIG. 3 are provided for generating logic signals Q2-Q6 indicating whether the thyristors T2-T6 are in the blocking or conducting state.

Figure 4:
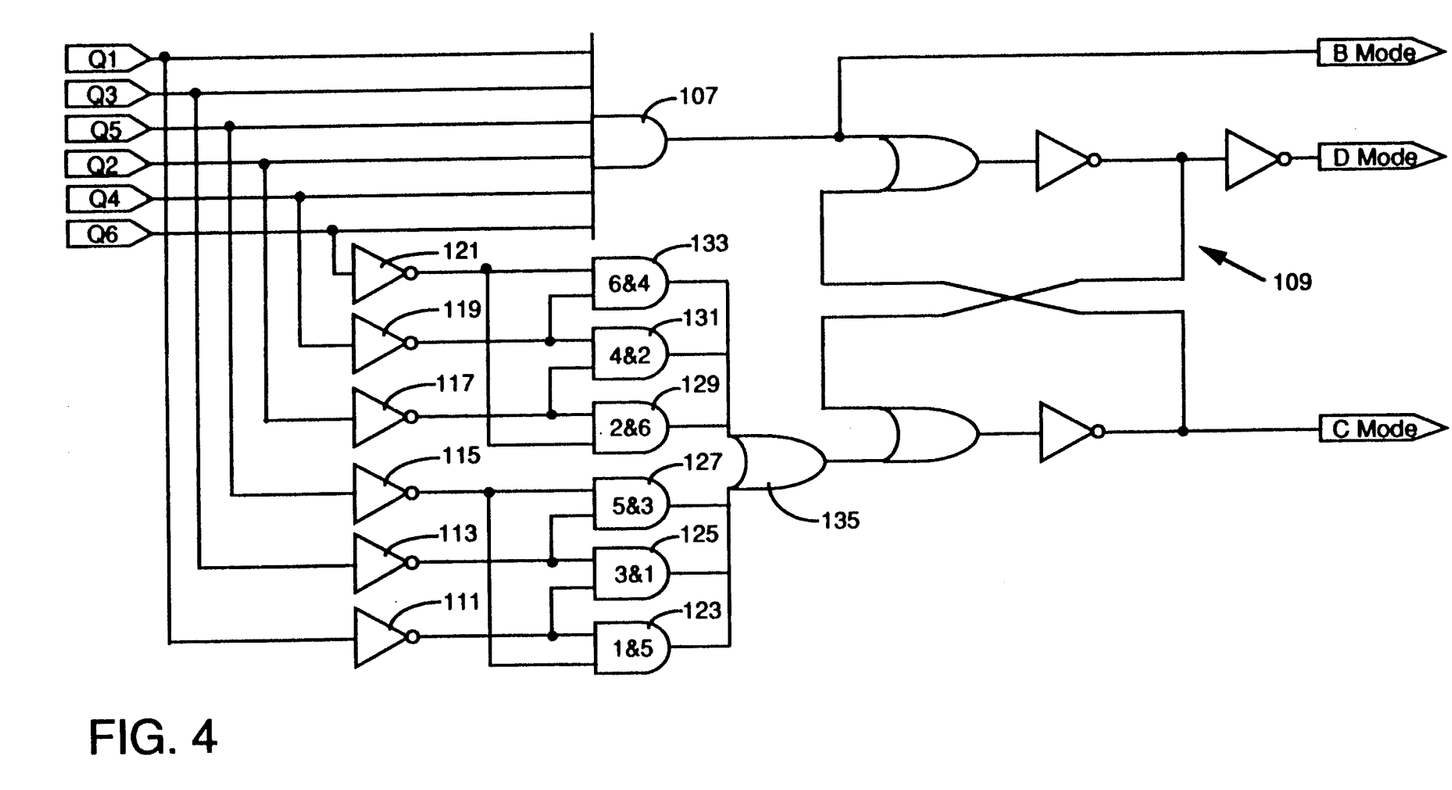
FIG. 4 is a schematic diagram of a circuit using the logic signals of FIG. 3 for determining the operating mode of the converter of FIG. 2.

Turning to FIG. 4, the logic signals Q1-Q6 are ANDed in gate 107 to generate a BCOND signal indicating, when high, that all of the thyristors T1-T6 are in the blocking condition. This BCOND signal also sets a flip-flop 109 to generate a signal DMODE indicating that the converter is operating in the discontinuous current mode. Each of the logic signals Q1-Q6 is also applied through one of the inverters 111 through 121 to one input of an AND gate 123 through 133, respectively. A second input to AND gate 123 is the negated value of the logic signal Q5. Similarly, AND gate 125 ANDs the negated values of Q1 and Q3 while AND gate 127 ANDs the negated values of Q5 and Q3. The states of the thyristors connected to the negative dc bus are also ANDed by gate 129 which ANDs the negated values of Q2 and Q6, gate 131 which ANDs the negated values of Q4 and Q2 and gate 133 which ANDs the negated values of Q6 and Q4. Thus, each of the AND gates 123 through 133 evaluates the condition of consecutively fired thyristors connected to the same dc bus. The outputs of the AND gates 123 through 133 are ORed by gate 135 so that if any two consecutively fired thyristors connected to the same dc bus are both on at the same time, indicating continuous mode operation of the converter, the flip-flop 109 is reset to cause the CMODE signal to go high. Thus, when the converter is operating in the continuous current mode the signal CMODE is high and when operating in the discontinuous current mode the signal DMODE is high.

Figure 5A:
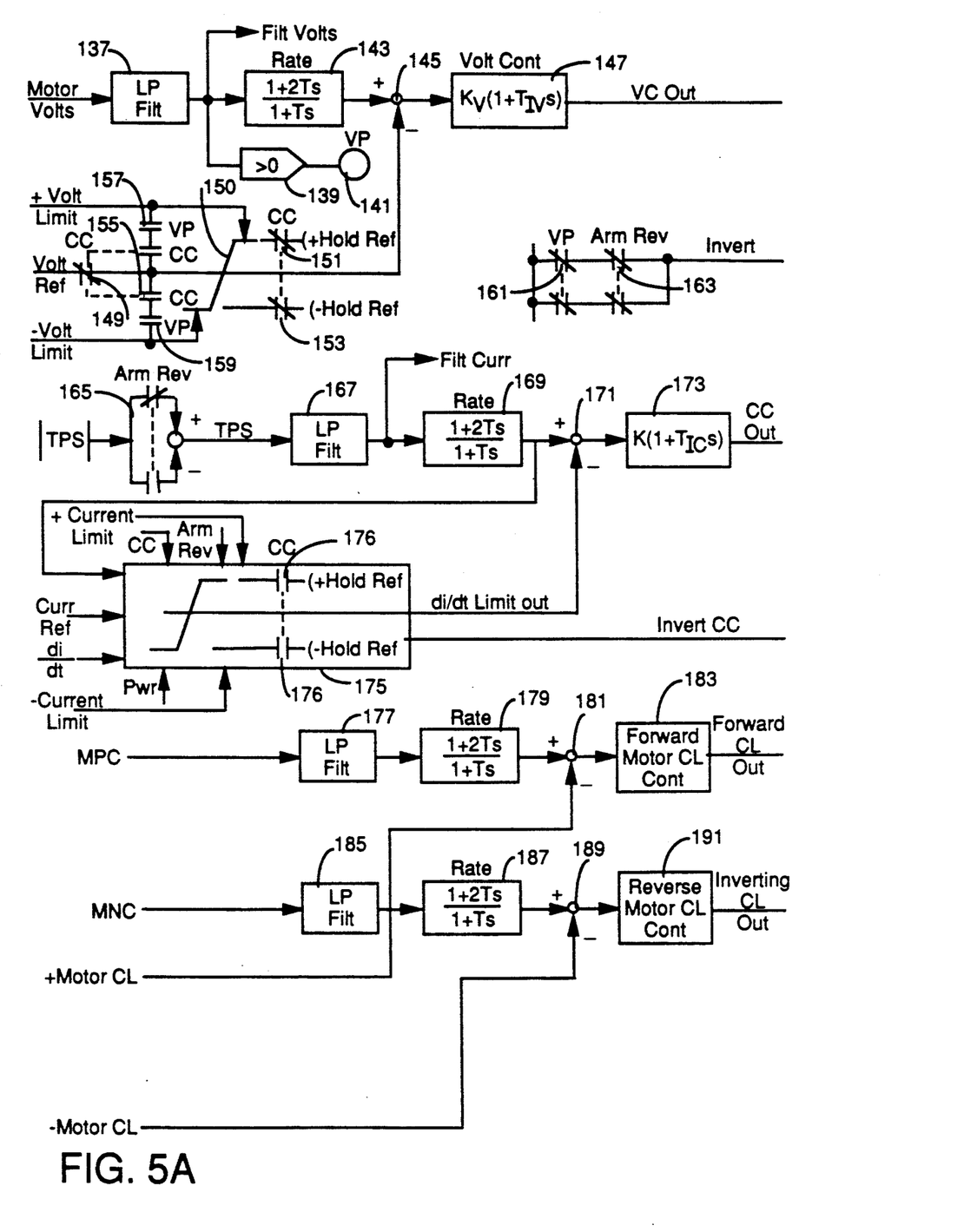
FIGS. 5A and B illustrate control system illustrated in FIG. 1.
Figure 5B:
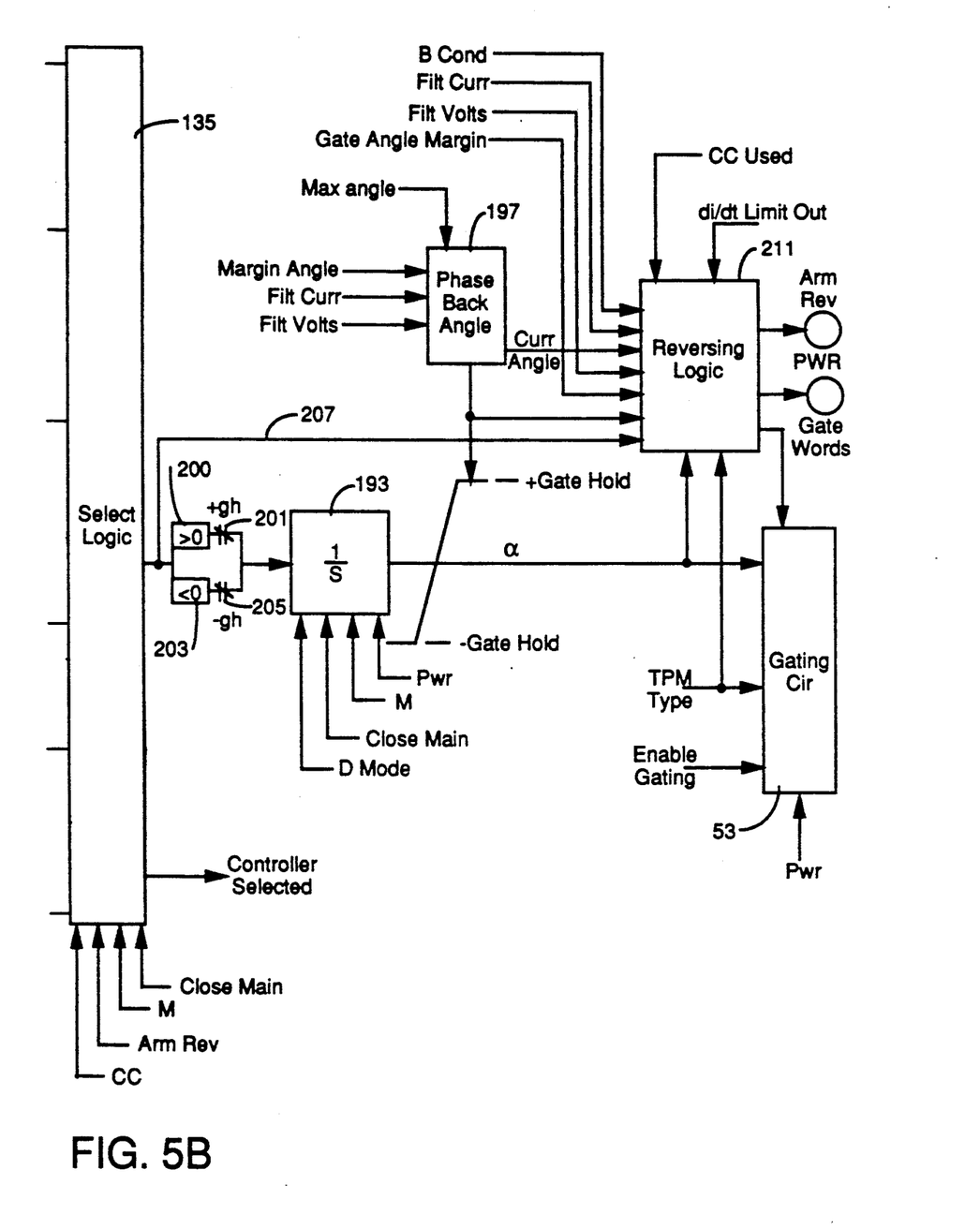

FIGS. 5A and B illustrate a logic diagram for the inner loop control 47. For the exemplary multiple motor control system, the inner loop control 47 includes four parallel loops: a voltage control loop, a current control loop, a forward motor current limit control loop, and a reverse motor current limit control loop. Each of these loops continuously generates a control signal for the associated parameter. Select logic 135 then selects the appropriate loop for control in a manner to be discussed.

For the voltage control (VC) loop, the armature voltage is filtered in a low pass filter 137 to generate a FILT VOLTS signal. If the FILT VOLTS signal is positive, as determined at 139, a positive voltage VP signal is generated at 141. Rate compensation 143 is applied to the filtered voltage signal, to improve response time and reduce overshoot, before a voltage error signal is generated by subtracting a voltage reference signal with limiting, LIM VOLT REF, at 145. Proportional plus rate control action is then applied to the error signal at 147 to generate the intermediate control signal VC OUT for the voltage control loop.

The LIM VOLT REF signal is generated from a VOLT REF signal when the inner loop is not in current control as indicated at 149. As shown by the response characteristic 150, this VOLT REF signal is linear between a +VOLT LIMIT signal and a −VOLT LIMIT signal. The LIM VOLT REF signal is constrained to these +VOLT LIMIT and −VOLT LIMIT signals. If the +VOLT LIMIT is reached when the inner loop is not in current control, as indicated at 151, a +HOLD REF signal is generated. Likewise, if the −VOLT LIMIT is reached when the system is not in current control as indicated at 153, a −HOLD REF signal is generated.

When the inner loop 47 is operating in the current control mode, as indicated at 155, the LIM VOLT REF signal is set to the +VOLT LIMIT if the armature voltage is positive as indicated at 157, or to the −VOLT LIMIT if the armature voltage is negative as indicated at 159.

An INVERT VC signal is generated if the armature voltage, as indicated by 161, and the armature current, as indicated by 163, are of opposite polarity.

The current control loop (CC) utilizes as the controlled parameter, a signal TPS representative of the magnitude of the ac supply current delivered to the armature, as measured by the current transformer 55 with the polarity determined in the block 165 by the direction of dc current in the armatures. This current signal is filtered in low pass filter 167 to generate a FILT CURR signal to which rate action is applied at 169. This controlled parameter signal is combined with a current reference signal with limiting, di/dt LIMIT OUT, at 171 to produce a controlled parameter error signal to which proportional and derivative action is applied in the current control module 173 to produce the intermediate control signal CC OUT, for the current loop.

The signal di/dt LIMIT OUT REF is generated in the module 175 from a current reference signal, CURR REF, generated by the outer speed reference loop 49, a desired di/dt reference and a +CURRENT LIMIT and a −CURRENT LIMIT. The module 175 also utilizes the signal CC indicating that the current control loop has been selected, an ARM REV signal, indicating the direction of current in the motor armatures, and a proceed with reversal (PWR) signal. The module 175 further utilizes the controlled parameter signal generated by the rate module 169.

As indicated by FIG. 5A, the module 175 regulates the di/dt LIMIT OUT signal between the +CURRENT LIMIT and the −CURRENT LIMIT signals. If these current limits are reached, and the inner loop is in current control, as indicated by 176, the +HOLD REF or −HOLD REF is generated. Between these limits, if the proceed with reversal (PWR) signal is present, and the system is in current control, the output of the module is reset to zero. If the system is not in current control, and the PWR signal becomes active, the output is set to +CURRENT LIMIT if the ARM REV is false, or to −CURRENT LIMIT if ARM REV is true. If the inner loop is in current control and the PWR signal is not high, the di/dt LIMIT OUT signal is limited to the +/− di/dt value from the last output value and to the +/− CURRENT LIMITS. If the inner loop is in voltage control and the rate modified feedback signal from the block 169 exceeds the di/dt reference value, then the di/dt LIMIT OUT signal is made equal to the rate modified feedback signal plus/minus the di/dt reference value for the time difference, limited to the +/− CURRENT LIMITS. If the rate modified feedback signal does not exceed the di/dt reference value, then di/dt LIMIT OUT is made equal to the +/− CURRENT LIMIT depending upon the state of the ARM REV signal. Alternatively, under these latter conditions, the di/dt LIMIT OUT signal can be set to the closest current limit.

The di/dt module 175 also generates an INVERT CC signal which is TRUE if the output of the di/dt module is positive and the ARM REV signal is true, or the output of the di/dt module is negative and the ARM REV signal is FALSE. Otherwise, the INVERT CC signal is FALSE.

The forward motor current limit control (FC) assures in the multiple motor installation that the current through each of the individual motor armatures does not exceed a preset limit. Thus, the most positive current signal MPC is filtered at 177 and rate compensation is applied at 179 to generate the controlled parameter signal from which the +MOTOR CL limit signal is subtracted at 181. Proportional plus derivative control action is then applied to this error signal at 183 to generate the FORWARD CL OUT intermediate control signal. Similarly, the most negative current signal, MNC, is passed through the low pass filter 185 and rate circuit 187 to generate the controlled parameter signal for the reverse motor current limit loop. The error between this control parameter and the −MOTOR CL limit signal is generated at 189. Proportional plus derivative control action is applied to this error signal at 191 to generate the intermediate control signal, REVERSE CL OUT.

As mentioned previously, the select logic 135 shown in FIG. 5B selects one of these inner loops for active control. The select logic 135 utilizes the current control signal CC, the ARM REV signal, a CLOSE MAIN signal which is a command to close a contactor to connect power to the motors, and an M signal which is TRUE when the main contactor is actually closed.

In accordance with the invention, a single integrator 193 operates on the intermediate control signal for the selected loop. As this intermediate control signal has been conditioned in the selected loop by proportional plus derivative control action, the integrator 193 further conditions the selected signal to produce a resultant signal conditioned with proportional plus integral control. In other words, the proportional term in the conditioning applied to the selected intermediate control signal becomes the integral term of the final control signal and the derivative term of the intermediate signal becomes the proportional term as a result of the integration at 193.

The integrator 193 only operates if the command has been given for the motor to run, CLOSE MAIN is TRUE, and the contactor has actually closed, M is TRUE. The output of the integrator 193, which is the delay angle, $\alpha$, for the firing of the thyristors in the TPMs, is limited to a minimum of +10 degrees and to a maximum limit set by Phase Back Angle module 197. If the firing angle, $\alpha$, reaches the maximum limit a +GATE HOLD signal is generated. Likewise, if the delay angle reaches the minimum of +10 degrees, a −GATE HOLD signal 15 generated. If the selected loop intermediate control signal has a positive polarity as detected at 199, and the upper limit has been reached, as indicated at 201, the input to the integrator is interrupted, so that the output holds at the limit. Similarly, when the selected intermediate control signal is negative in polarity as indicated at 203, and the delay angle is at the negative limit, as indicated at 205, the input to the integrator 193 is also interrupted.

When the system is operating in the continuous current mode, the gain KS of the integrater 193 is fixed at 1. However, when discontinuous current is detected, the resultant discontinuous current mode signal DMODE generated in FIG. 4, goes high to adjust the gain KS of the integrator 193.

The phase back module 197 sets the positive limit for the firing angle generated by the integrator 193. This phase back angle is also provided to reversing logic 211. This phase back angle is generated by the module 197 from the FILT CURR, and the FILT VOLTs. The module generates the maximum firing angle which will produce zero current. A selected MARGIN ANGLE is added to this calculated angle, and the result is limited by a MAX ANGLE signal. The phase back angle module 197 also generates a CURR ANGLE logic signal which is high when the current is at a level acceptable for reversing.

The reversing logic 211 utilizes FILT CURR, MARGIN ANGLE, CURR ANGLE, and di/dt LIMIT OUT, together with the BCOND signal (indicating that all the thyristors are blocking) and the CC USE signal (indicating that current control has been selected by the operator) to determine the bank of thyristors to be fired. The reversing logic also utilizes the output of the integrator 193. The logic applied by the reversing logic module 201 is as follows: If the contactor for the motors is closed and no attempt is being made to open the contactor, the logic determines whether the current control loop or some other loop has been selected by logic 135. If current control has been selected, and the di/dt LIMIT OUT signal is of a polarity tending to drive the current control signal CC OUT toward zero, and all of the thyristors are blocking (BCOND TRUE), then the current can be reversed. To this end, gating is disabled, a change is made to the opposite thyristor bank, and gating is again enabled.

If the system is not in current control, and current is not the deciding factor in setting the delay angle (CURR ANGLE is false), and the phase back angle generated by the integrator is greater than the phase back angle required for the thyristors to conduct current, and all the thyristors are blocking (BCOND TRUE), the current also can be reversed by making a thyristor bank reversal. Again, gating is disabled while the transfer is made to the opposite bank and then gating is reenabled.

The reversing in logic module 211 generates gate words indicating the next thyristor to be fired depending upon the direction of the current to be gated to the motors. The gate words, together with the delay angle generated by the integrator, are supplied to the gating circuit 53, which as previously discussed supplies the firing pulses to the TPM 27. The reversing logic module 211 also generates the ARM REV signal which is TRUE when the reverse bank is being fired and FALSE for the forward bank. In addition, the module 211 generates the proceed with reversal signal PWR when gating is disabled for a reversal.

Figure 6:
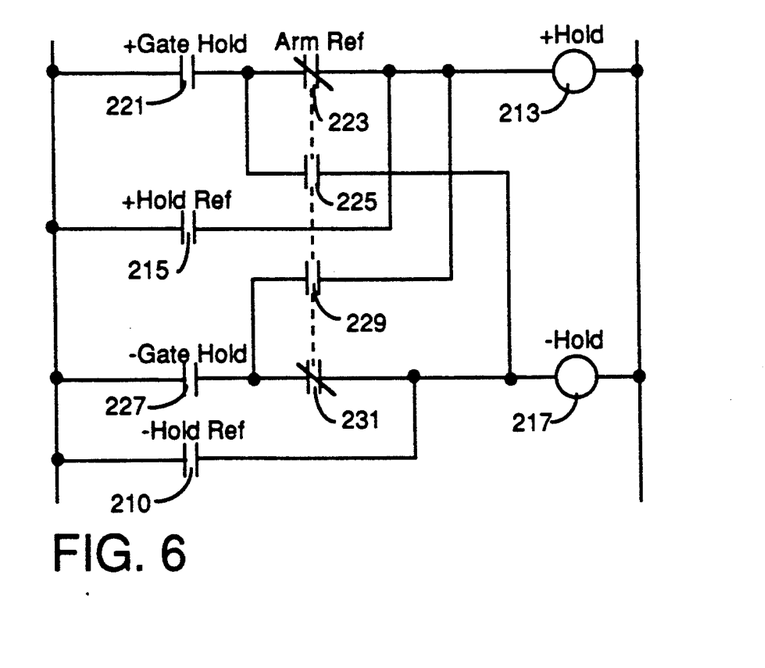
FIG. 6 is a logic diagram illustrating additional logic used by the motor control system illustrated in FIG. 1.

FIG. 6 illustrates the logic for generating the +HOLD and −HOLD signals. The +HOLD signal is generated at 203 when the +HOLD REF signal is generated by the LIM VOLT REF signal generating circuit in FIG. 5 as indicated by the contacts 215 in FIG. 6. This occurs, it will be recalled, when the system is not in current control and the LIM VOLT REF signal reaches the +VOLT LIMIT. Similarly, the −HOLD signal is generated at 217 in FIG. 6 when the −HOLD REF signal is generated as indicated by 219. As discussed previously, the −HOLD REF signal is generated in FIG. 5 when the system is not in current control and the −VOLT LIMIT is reached by the LIM VOLT REF signal. If the firing angle generated by the integrator 193 reaches the phase back angle so that +GATE HOLD signal is generated as indicated at 221, the +HOLD signal is generated at 213 if the forward bank is fired (ARM REV at 223 is FALSE) or the −HOLD signal is generated at 217 if the reverse bank is being fired (ARM REV at 225 is TRUE). The −GATE HOLD signal at 227 generates the +HOLD 213 if the forward bank is being fired (ARM REV is TRUE at 229) or generates the −HOLD signal at 217 if the forward bank is being fired (ARM REV is FALSE at 231).

Figure 7A:
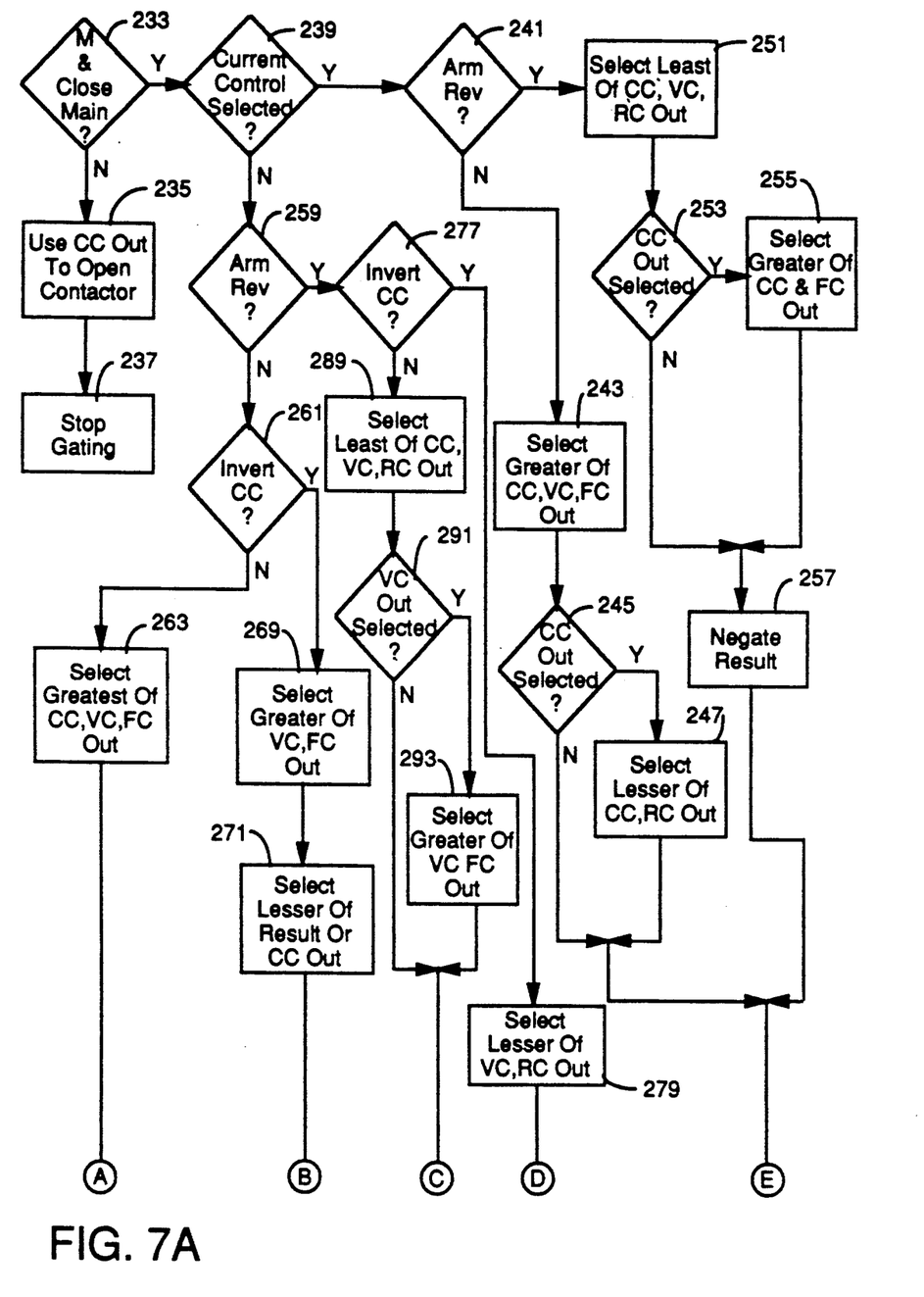
FIGS. 7A and B illustrate a flow chart of a routine used as part of the logic illustrated in FIG. 5.
Figure 7B:
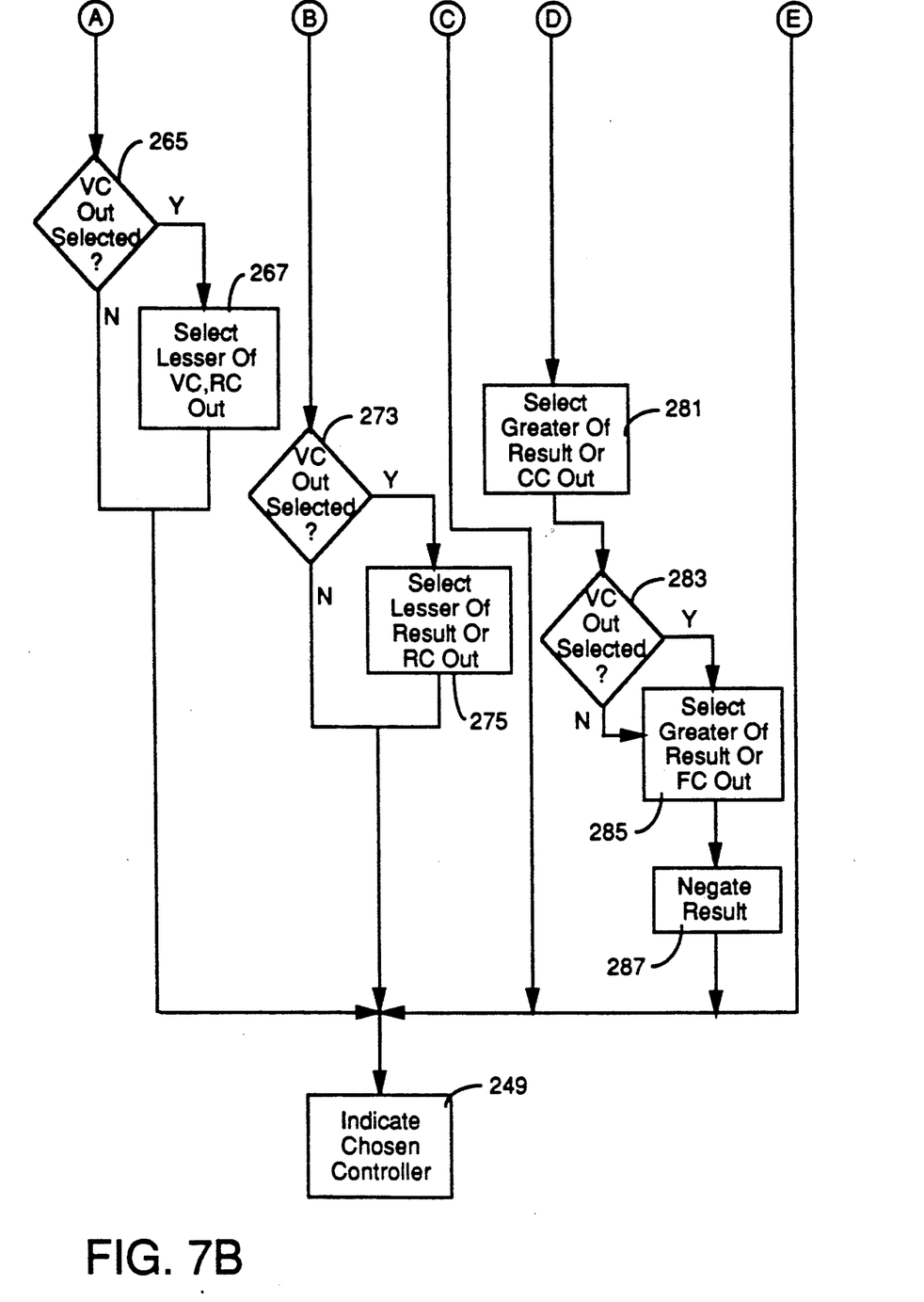

FIGS. 7A and B illustrates a flow chart for a suitable program for implementing the select logic 135 in FIG. 5. If the system is not set to run, as indicated by either the CLOSE MAIN signal or the M signal being FALSE at 233, the current control CC OUT signal is used at 235 to open the contactor, and then the command is given at 237 to stop gating.

If the motors are running, and current control has been selected as the desired mode of operation at 239, and if the forward bank of thyristors is being fired, as indicated by the ARM REV signal being FALSE at 241, the greatest of the CC OUT, VC OUT and FC OUT is selected at 243. If this results in the selection of CC OUT at 245, then the lesser of CC OUT and RC OUT is selected at 247. The chosen controller is then indicated at 249 and the intermediate control signal from that controller is applied to the integrator 193 for generating the final control signal for the inner loop.

If the system is in current control, but the reverse bank of thyristors is being fired as determined at 241, the least of CC OUT, VC OUT and RC OUT is selected at 251. If this results in the selection of CC OUT as determined at 253, then the greater of CC OUT and FC OUT is selected at 255. Whichever intermediate control signal is selected, it is negated at 257. Again, the chosen controller is then indicated at 249.

If current control has not been selected by the operator at 239, the forward bank of thyristors is being fired as determined at 259, and the INVERT CC signal is FALSE at 261, then the greatest of CC OUT, VC OUT and FC OUT is selected at 263. If this results in the selection of VC OUT at 265, then the lesser of VC OUT and RC OUT is selected at 267. In either case, the chosen controller is indicated al 249.

When the forward bank of thyristors is being fired as determined by the ARM REV signal at 259, but the INVERT CC signal is detected at 261, the greater of VC OUT, and FC OUT is selected at 269. Then the lesser of that signal selected and CC OUT is selected at 271. If this results in the selection of VC OUT at 273, then the lesser of VC OUT and RC OUT is selected at 275. Again, the chosen controller s indicated at 249.

When the reverse bank of thyristors is being fired in the voltage controlled mode as determined at 253, and the invert CC signal is being generated as determined at 277, then the lesser of VC OUT and RC OUT is selected at 279. The greater of that selected signal and CC OUT is then selected at 281. If this results in the selection of VC OUT at 283, then the greater of VC OUT and FC OUT is selected at 285. In either case, the selected signal is negated at 287 before the chosen controller is indicated at 249.

If the voltage control has been selected by the operator, the reverse bank of thyristors is being fired and the INVERT CC signal is FALSE as detected at 277, the least of CC OUT, VC OUT and RC OUT is selected at 289. If this results in the selection of VC OUT, as determined at 291, then the greater of VC OUT and FC OUT is selected at 293. In either case, the chosen controller is indicated at 249.

The selection logic illustrated in FIG. 7 selects the inner control loop which produces the greatest phase back angle, i.e., the greatest delay in firing angle, so that the restrictions on all of the loops are complied with.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A control system for controlling energization of a dc motor with ac power, said control system comprising:
    converter means having a plurality of switches sequentially gating portions of half cycles of said ac power to said dc motor in response to sequentially generated firing signals to provide dc power to said motor; and
    digital processor means comprising means digitally generating plural parallel control loops each controlling a selected motor parameter in response to an associated parameter signal, each said control loop including digital means applying selected control action to the associated parameter signal to generate an associated intermediate control signal, a common digital integrator means, means selecting one of said associated intermediate control signals for application to said common digital integrator means to generate a resultant control signal having an integral of said selected control action which is applied to the selected one of said associated intermediate control signals, and means generating said firing signals in response to said resultant control signal.

2. The control system of claim 1 wherein said digital means in each control loop applies derivative and proportional control to the associated parameter signal as said selected control action, and wherein said common digital integrator means generates said resultant control signal having proportional and integral control action.

3. The control system of claim 2 wherein said means selecting one of said associated intermediate control signals, selects the intermediate control signal of greatest magnitude.

4. The control system of claim 2 wherein said means selecting one of said associated intermediate control signals selects the associated intermediate control signal which generates firing signals which delay firing of said switches by the greatest amount.

5. The control system of claim 2 including means detecting continuous current operation and discontinuous current operation of said converter means and having means adjusting compensation applied to said resultant control signal between said continuous current operation and discontinuous current operation.

6. The control system of claim 2 wherein said means digitally generating plural parallel control loops includes means generating a current control loop and a voltage control loop.

7. The control system of claim 6 adapted for controlling the energization of plural dc motors with ac power, said control system including means determining the largest current through any one of said plural motors and wherein said means digitally generating plural parallel control loops further includes means generating an additional loop controlling said largest current.

8. The control system of claim 7 wherein said means generating said firing signals delays the firing signals as a function of said resultant control signal and wherein said means being selecting one of said associated intermediate control signals for application to said common digital integrator means selects the intermediate control signal which delays said firing signals the most.

9. A control system for controlling energization of a dc motor with ac power, said control system comprising:
    converter means having a plurality of switches sequentially gating portions of half cycles of said ac power to said dc motor in response to sequentially generated firing signals to provide dc power to said motor, said converter means operating in a discontinuous current operating mode and a continuous current operating mode;
    voltage detecting means detecting voltage across each of said plurality of switches; and
    signal generating means generating as a function of the voltages across the plurality of switches a discontinuous current operating mode signal when said converter means is operating in said discontinuous current operating mode.

10. The control system of claim 9 wherein said converter means includes two dc buses, wherein some of said plurality of switches are connected to one of said dc buses and others of the switches are connected to the other dc bus, and wherein said signal generating means comprises means set to generate said discontinuous current operating mode signal when there is at least a preselected voltage across each of said plurality of switches and set to terminate said discontinuous current operating mode signal when substantially no voltage is simultaneously detected across any two consecutively fired switches both connected to the same dc bus.

11. The system of claim 10 wherein said converter means includes a forward bank of said switches for operating said dc motor in a forward direction and a reverse bank of said switches for operating said dc motor in a reverse direction, and reversing means switching delivery of said firing signals from one bank of switches to the other bank of switches only when said voltage is above said at least preselected voltage across each of said switches.

12. The system of claim 11 wherein said voltage detecting means includes means maintaining an indication that voltage across the switch is at least said preselected voltage for an interval as the ac voltage applied to said switch passes through zero.

13. The system of claim 9 wherein said signal generating means further generates a continuous current operating mode signal when said converter means is operating in said continuous current operating mode.

14. The system of claim 13 wherein said converter means includes two dc buses, wherein some of said plurality of switches are connected to one of said dc buses and others of the switches are connected to the other dc bus, and wherein said signal generating means comprises means set to generate said discontinuous current operating mode signal when there is at least a preselected voltage across each of said plurality of switches and set to terminate said discontinuous current operating mode signal when substantially no voltage is simultaneously detected across any two consecutively fired switches both connected to the same dc bus.

* * * * *